United States Patent [19]

Gannon et al.

[11] 4,307,052

[45] Dec. 22, 1981

[54] PROCESS FOR CARBON ELECTRODE MANUFACTURE

[75] Inventors: Charles R. Gannon; William R. Sawran, both of Ashland, Ky.

[73] Assignee: Ashland Oil, Inc., Ashland, Ky.

[21] Appl. No.: 178,591

[22] Filed: Aug. 15, 1980

Related U.S. Application Data

[62] Division of Ser. No. 925,027, Jul. 17, 1978, Pat. No. 4,218,305.

[51] Int. Cl.[3] ...................... B29J 1/00

[52] U.S. Cl. ...................... 264/105; 264/300

[58] Field of Search ...................... 264/105, 29.5, 300; 208/14, 19

[56] References Cited

U.S. PATENT DOCUMENTS

| | | | |
|---|---|---|---|
| 2,764,529 | 9/1956 | Leygonie et al. | 208/19 |
| 2,852,445 | 9/1958 | Howard et al. | 208/19 |
| 2,900,322 | 8/1959 | Zoeller | 208/19 |
| 3,003,937 | 10/1961 | Lucchesi et al. | 208/19 |
| 3,284,372 | 11/1966 | Bailey | 264/105 |
| 4,188,279 | 2/1980 | Yan | 264/105 |

*Primary Examiner*—James H. Derrington
*Attorney, Agent, or Firm*—Pollock, Vande Sande & Priddy

[57] ABSTRACT

Disclosed is a carbon extrusion oil for preparing carbon and graphite electrodes. The composition comprises a mixture of straight-chain paraffin hydrocarbons and cylinder stock derived from a naphthenic type of crude oil. This invention relates to a method for producing extruded carbon or graphite bodies and to a composition for use therein.

4 Claims, No Drawings

PROCESS FOR CARBON ELECTRODE MANUFACTURE

This application is a division of Ser. No. 925,027, filed July 17, 1978, now U.S. Pat. No. 4,218,305.

BACKGROUND OF THE INVENTION

Carbon and graphite electrodes can be made by incorporating calcined coke derived from coal or petroleum, lamp black, thermal carbon black, graphite and the like in a binder which coats the surface of the particles. The paste-like mixture subsequently is extruded into desired electrode lengths which then are slowly baked at temperatures up to about 2000° F., until the electrodes assume a hard condensed structure. They may be further treated at temperatures above 4500° F., to graphitize them.

In the extrusion process prior to baking the electrodes, the incorporation of a lubricant onto the working surfaces of the extrusion die ordinarily is necessary to ensure producing electrodes having a continuously exterior smooth surface. In the past, residues of vacuum distilled paraffinic crude oils such as the Pennsylvania type have been used as carbon extrusion oils. However, many of these residues, because of their high concentration of aromatic and naphthenic fractions, have not proved suitable. They have, at times, proved to be too miscible with the green extruded carbon pieces.

An object of this invention, therefore, is to provide a new and improved carbon extrusion oil. Still another object of this invention is to provide an improved process for the manufacture of carbon electrodes.

SUMMARY OF THE INVENTION

Briefly stated, this invention comprises in one aspect a carbon extrusion oil for use in extruding green carbon pieces comprising a mixture of long straight-chain paraffins and cylinder stock oil. In another aspect this invention comprises a process for extruding green electrodes utilizing the extrusion oil of this invention.

The carbonaceous (carbonizable) material used in making the electrodes of this invention can be any carbonaceous material known in the art of making a baked carbon, graphite, carbide, or carbonized-binder containing body. Examples of such carbonaceous materials are coke, charcoal and carbon black. Coke is the preferred carbonaceous material. The coke can be the residue derived from distillation by known methods of any coke-forming material, for example, bituminous or anthracite coal, lignite or petroleum. Petroleum coke in calcined form is particularly preferred. The carbonizable material preferably is prepared for use by grinding it so that it will pass through a $\frac{1}{8}$ inch opening in a screen and not more than about 75% by weight of the material will be retained on a 100 mesh Tyler standard sieve. In preparing the carbonaceous material for charge to the extrusion press, the material is mixed with a material known in the art to be a binder which preferably also is carbonaceous. Such binders can be coal-tar pitch, petroleum pitch, synthetic resins, and other materials. The amount of binder used is from about 10 to about 40 parts by weight per 100 parts of the carbonaceous material.

A particularly preferred carbonizable mixture for practicing this invention is prepared by blending or mixing together a mixture of from 60 to 90 parts of calcined petroleum coke ground to pass a $\frac{1}{8}$ inch screen opening, 10 to 40 parts of solidified coal-tar pitch or petroleum pitch ground to pass a $\frac{1}{8}$ inch screen opening and from 0 to 2.5 parts of the extrusion oil composition further described herein.

The carbon extrusion oil comprises between about 45 and about 75 parts by weight of a straight paraffinic material derived from a lube oil refining operation. In a typical lube oil refining operation, bulk distillate and/or light vacuum gas oil is distilled under a reduced pressure of between about 20 mm and about 100 mm Hg. absolute at a temperature of between 500° F. (260° C.) and 1000° F. (538° C.). The distillate product obtained is then extracted with a solvent having an affinity for aromatic hydrocarbons such as furfural, phenol or similar materials. The raffinate from this aromatic extraction is then further subjected to solvent de-waxing to divide the paraffinic components remaining into straight-chain paraffins and branched chain paraffins. The straight paraffins derived from this process are the paraffinic compounds used in the extrusion oil of this composition and ordinarily will have an average number of carbon atoms per molecule of between about 16 and about 45.

The other component of this composition, the cylinder stock, is a hydrocarbon derived from the distillation, under reduced pressure, of atmospherically topped crude petroleum to about 1250° F. (677° C.) and can be further characterized as having an average number of carbon atoms per hydrocarbon molecule of between about 40 and about 70.

The carbon extrusion oil is used in the electrode-making process by applying it to the areas of contact between the extrusion die and the mixture of ground carbonaceous material and binder as this mixture is forced through the extrusion die.

What is claimed is:

1. A process for extruding green carbon electrodes comprising forcing a mixture of a carbonaceous material and a binder selected from the group consisting of coal-tar pitch, petroleum pitch and synthetic resins, through an extrusion die while applying to the area of contact between said mixture of carbonaceous material and binder and said extrusion die an extrusion oil comprising between about 45 and about 75 parts by weight per 100 parts of a mixture of straight-chain paraffinic hydrocarbons having an average number of carbon atoms per molecule between about 16 and about 45 and a cylinder stock derived from crude petroleum.

2. The process of claim 1 wherein said extrusion oil comprises between about 45 and about 75 parts by weight per 100 parts of a mixture of straight-chain paraffinic hydrocarbons having an average number of carbon atoms per molecule of between about 16 and 45 and a cylinder stock derived from crude petroleum, wherein said straight-chain paraffinic hydrocarbons are derived by:

(a) distilling light vacuum gas oil under a reduced pressure of between about 20 mm and about 100 mm of mercury absolute at a temperature of between about 260° C. and about 538° C.;

(b) extracting the distillate obtained from step (a) with a solvent having an affinity for hydrocarbons, thereby obtaining an extract product and a raffinate product; and (c) solvent de-waxing the raffinate product of step (b) thereby obtaining a straight-chain paraffin fraction and a branched chain paraffin fraction.

3. The process of claim 2 wherein said cylinder stock is derived by distilling atmospherically topped crude petroleum at a pressure less than atmospheric pressure.

4. The process of claim 2 wherein said cylinder stock has an average number of carbon atoms per hydrocarbon molecule of between about 40 and about 70.

* * * * *